United States Patent
Chen et al.

(10) Patent No.: US 8,263,284 B2
(45) Date of Patent: Sep. 11, 2012

(54) FUEL CELL FLUID FLOW PLATE WITH SHELL PASSAGEWAY PIECE

(75) Inventors: Chi-Chang Chen, Changhua County (TW); Huan-Ruei Shiu, Penghu County (TW); Shiqah-Ping Jung, Taoyuan County (TW); Fanghei Tsau, Kaohsiung County (TW); Wen-Chen Chang, Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 716 days.

(21) Appl. No.: 12/433,261

(22) Filed: Apr. 30, 2009

(65) Prior Publication Data

US 2010/0124690 A1 May 20, 2010

(30) Foreign Application Priority Data

Nov. 14, 2008 (TW) .............................. 97142457 A

(51) Int. Cl.
*H01M 2/38* (2006.01)
(52) U.S. Cl. ......... 429/457; 429/458; 429/513; 429/514
(58) Field of Classification Search .............. 429/9, 413, 429/457, 458, 481, 513, 514, 456, 512
See application file for complete search history.

(56) References Cited

U.S. PATENT DOCUMENTS

| | | | |
|---|---|---|---|
| 4,678,724 A * | 7/1987 | McElroy | 429/434 |
| 5,464,700 A | 11/1995 | Steck et al. | |
| 5,514,487 A | 5/1996 | Washington et al. | |
| 5,750,281 A | 5/1998 | Washington et al. | |
| 5,945,232 A * | 8/1999 | Ernst et al. | 429/413 |
| 6,007,933 A * | 12/1999 | Jones | 429/481 |
| 6,017,648 A | 1/2000 | Jones | |
| 6,146,779 A * | 11/2000 | Walsh | 429/423 |
| 6,232,008 B1 | 5/2001 | Wozniczka et al. | |
| 6,274,262 B1 | 8/2001 | Canfield | |
| 6,406,807 B1 * | 6/2002 | Nelson et al. | 429/413 |
| 6,410,179 B1 | 6/2002 | Boyer et al. | |
| 6,500,580 B1 | 12/2002 | Marvin et al. | |
| 6,607,858 B2 | 8/2003 | Wozniczka et al. | |

(Continued)

FOREIGN PATENT DOCUMENTS

JP   8-180883   7/1996

(Continued)

OTHER PUBLICATIONS

Taiwan Patent Office Action Issued on Apr. 23, 2012.
Japan patent office action issued on Jan. 31, 2012.
China patent office action issued on Feb. 17, 2012.

*Primary Examiner* — Joseph Drodge
(74) *Attorney, Agent, or Firm* — WPAT, PC; Justin King

(57) ABSTRACT

A fluid cell fluid flow plate comprises: a fluid flow plate, having one face being a fluid flow face for receiving a reactive fluid and the other face being a non-active surface, provided with a first manifold, a second manifold, and a flow channel disposed on the fluid flow face; and a shell passageway piece, configured with parallel-disposed first face and second face that are connected to each other through a connecting face with at least one through hole provided thereon; wherein the flow channel being respectively connected to the first manifold through a first opening and to the second manifold through a second opening; and when the shell passageway piece and the fluid flow plate are combined, the first face contacts the fluid flow face, the second face contacts the non-active surface, and the first manifold communicates with the first opening by the through hole.

26 Claims, 8 Drawing Sheets

U.S. PATENT DOCUMENTS

| | | |
|---|---|---|
| 6,610,435 B1 | 8/2003 | Maruyama et al. |
| 7,494,737 B2 * | 2/2009 | Arisaka et al. ................ 429/457 |
| 2006/0134498 A1 * | 6/2006 | Hamm et al. ................... 429/37 |
| 2008/0124586 A1 * | 5/2008 | Wang et al. ....................... 429/9 |

FOREIGN PATENT DOCUMENTS

| | | |
|---|---|---|
| JP | 2003-197249 | 7/2003 |
| JP | 2004-349014 | 12/2004 |
| JP | 2005-174908 | 6/2005 |

* cited by examiner

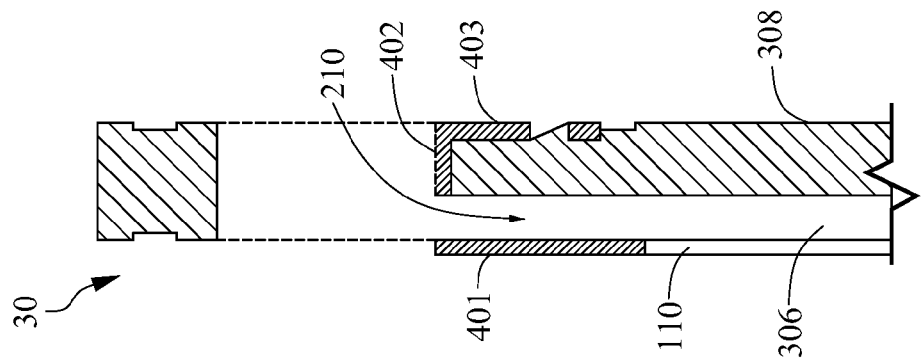
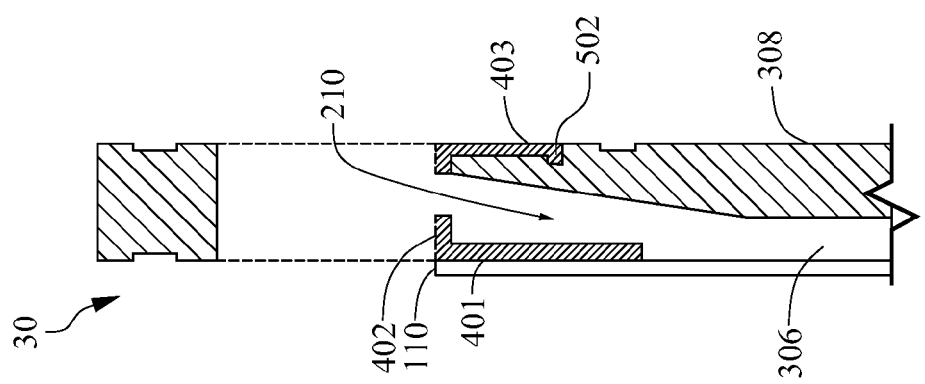
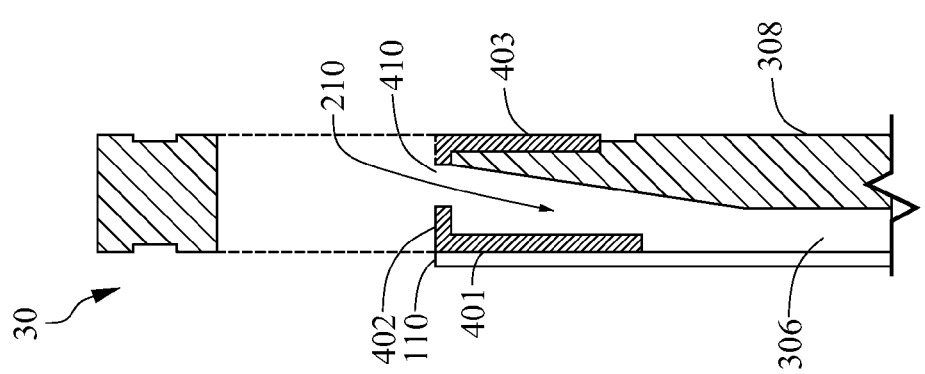

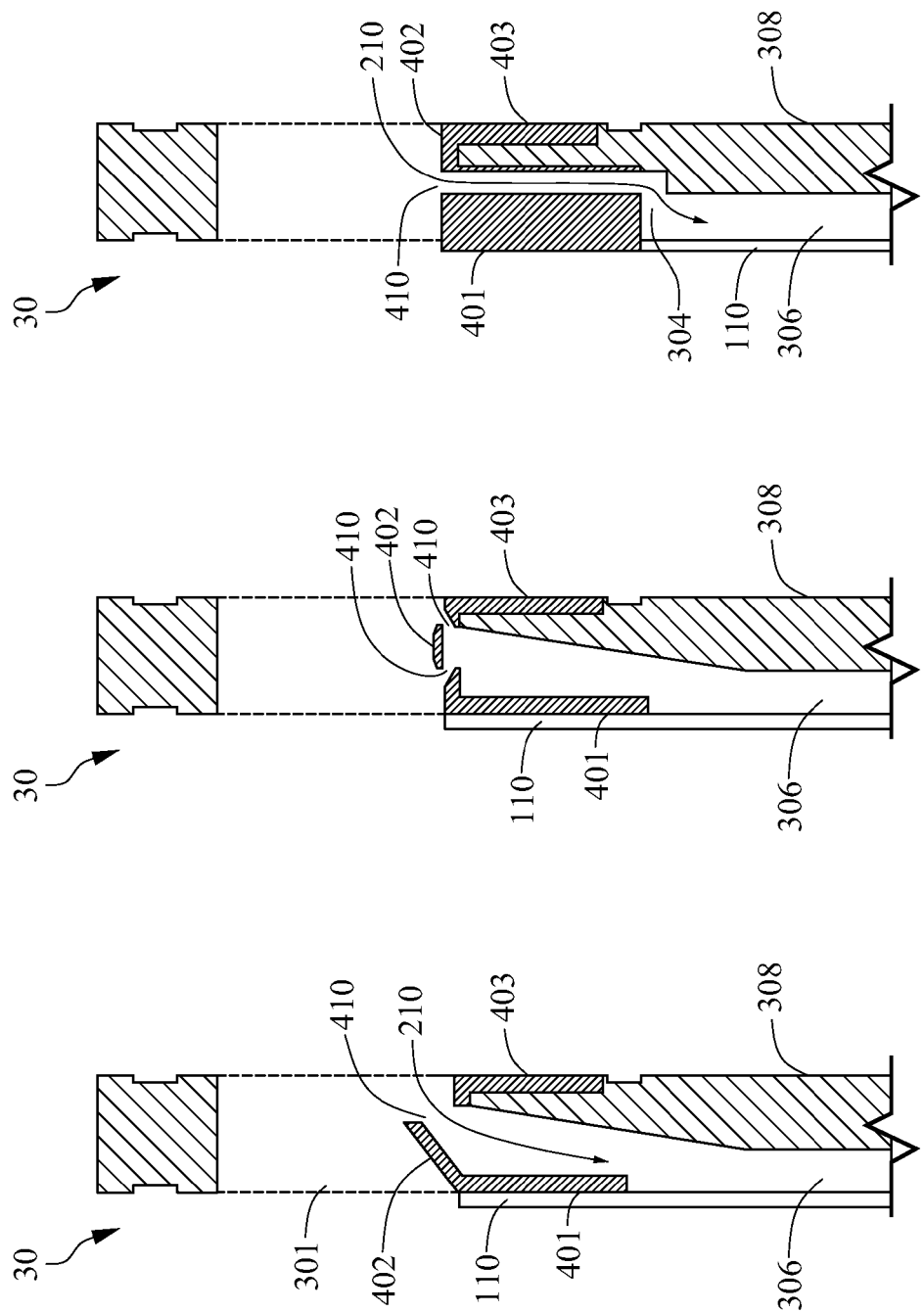

FUEL CELL FLUID FLOW PLATE WITH SHELL PASSAGEWAY PIECE

1. FIELD OF THE INVENTION

The present invention generally relates to a fuel cell fluid flow plate and, more particularly, to a fuel cell fluid flow plate having a shell passageway piece.

2. BACKGROUND OF THE INVENTION

The proton exchange membrane fuel cell (PEMFC), also referred to as the polymer membrane fuel cell, comprises at least a fuel cell, as shown in FIG. 1. The fuel cell 10 comprises a membrane electrode assembly (MEA) 110, two gas diffusion layers (GDL) 105 and 107, and two fluid flow plates 101 and 102. The gas diffusion layers 105 and 107 are clipped between the fluid flow plates 101 and 102. The membrane electrode assembly 110 is clipped between the gas diffusion layer 105 and 107. The fluid flow plates 101 and 102 are provided with respective flow channels 103 and 104 for delivering and distributing reactant fluids required by the fuel cell and the residual fluid after reaction. The delivered and distributed fluid includes hydrogen or humid hydrogen on the anode side and the residual fluid and water as a product after reaction on the cathode side.

The membrane electrode assembly 110 experiences oxidation on the anode side and reduction on the cathode side. When hydrogen on the anode side contacts the catalyst 106 (or 108, generally formed of platinum or platinum-based alloys) adjacent to the proton exchange membrane 109, hydrogen molecules are dissociated into hydrogen ions and electrons. The electrons move from the anode to the cathode by way of a bridge connecting the anode and the cathode and a load connected to the bridge, while the hydrogen ions move from the anode to the cathode directly through the proton exchange membrane 109. It is noted that the proton exchange membrane 109 is a membrane with humidity and only allows hydrogen ions accompanied by water molecules to pass through while. On the cathode side, with the catalyst 108 (or 106), the electrons by way of the bridge are combined with oxygen to produce oxygen ions, which are immediately combined with the hydrogen ions passing through the proton exchange membrane 109 to produce water molecules. Thus, electrochemical oxidation-reduction reaction is completed.

By using such electrochemical reaction, the proton exchange membrane fuel cell (PEMFC) exhibits high power generation efficiency, environment-friendliness, rapid response and capability in forming cell stacks to increase the voltage of the cell and/or the current due to enlarged electrode area, as shown in the top view in FIG. 2. As the fuel cell is supplied with continuous reactant fluid, it provides the load with continuous power. Accordingly, the proton exchange membrane fuel cell can be used as a power source for small systems and can be designed in a large power plant, distributed systems and mobile systems.

In FIG. 2, the fuel cell stack 20 comprises stacked fuel cells 10 and two end plates 201 and 202, two current collectors 205 and 206, and a plurality of fasteners 203 and 204.

The fluid flow plates can be structured as they are designed. Generally, the fluid flow plates on the anode side and on the cathode are similar or identical. FIG. 3 is a cross-sectional view of FIG. 2 and shows a fluid flow plate. The fluid flow plate 30 has one face being a fluid flow face 305 for receiving a reactant fluid, and a non-active surface 308. The fluid flow plate 30 is provided with an inlet manifold 301 for receiving a fluid 210 from a source and at least an outlet manifold 302 for exhausting a reacted fluid 211 to be exhausted. The fluid flow face 305 is provided with at least one flow channel 306 for distributing and delivering the fluid. The flow channel 306 comprises an entry 304, an export 307, and at least a groove inserted with a sealing member 303 for sealing the fuel cell to complete a fluid flow plate.

For a fuel cell stack, after passing through the inlet manifold 301, the reactant fluid 210 flows into each flow channel 306 for electrochemical reaction in the fluid flow plate 30 of a fuel cell 10, while the reacted fluid 211 is exhausted from the outlet manifold 302. Such mechanism is a key to the reliability and stability of the fuel cell. Moreover, gas-tightness is another key to the functionality of the fuel cell. If the fuel cell is not gas-tight, leakage or crossover of the reactant fluid occurs on the cathode side and the anode side, which causes damages to the fuel cell stack. At the entry 304 and the export 307 of the flow channel 306, the fuel cell is weakly supported and gas-tightness is likely to fail. As the assembly stress is distributed over each components of the cell stack 20 and the portion where the inlet manifold 301 and the outlet manifold 302 are disposed is not supported, the membrane electrode assembly 110 and the gas diffusion layers 105 and 107 may come apart easily to cause crossover of reactant fluid, or the membrane electrode assembly 110 and gas diffusion layer 105 and 107 may sink at the entry 304 and the export 307 of the flow channel 306 to block the fluid flowing into or out of the fluid flow plate 30. Therefore, it has become an important issue of how to let the fluid flow into or out of the fuel cell without obstruction while maintaining the gas-tightness of the fuel cell.

U.S. Pat. No. 6,017,648 discloses an insertable fluid flow passage bridge piece and a method for manufacturing the same. The bridge piece is inserted into an open-face fluid flow channel of a fluid flow plate. The bridge piece is provided with at least one flow channel on one face so that the fluid is allowed to flow through. Moreover, the method for manufacturing the bridge piece is disclosed.

U.S. Pat. No. 6,410,179 discloses a fluid flow plate having a bridge piece. The bridge piece is disposed on an open-face fluid flow channel of a fuel cell fluid flow plate. The bridge piece has a face for defining a groove adapted to receive a sealing member and the other face for defining a flow channel, through which the fluid is allowed to flow.

The above mentioned patents use a bridge piece, which causes difficulty in aligning components and dislocations of components during assembly and results in troubles in mass production.

U.S. Pat. No. 6,500,580 discloses a fuel cell fluid flow plate for promoting fluid service, wherein an inlet channel is connected to a manifold for distributing a reactant in the fuel cell and dive through hole is defined in and extends through the fluid flow plate so that the dive through hole and the inlet channel facilitate transmission of a portion of the fluid to the flow channel.

U.S. Pat. No. 6,607,858 discloses an electrochemical fuel cell stack with improved reactant manifolding and sealing, wherein separator plates are provided with ports comprising walls that have faces that are angled more than 0 degree and less than 90 degrees with respect to the direction of fluid flow.

In the above mentioned patents, though holes are required and thus drilling and alignment processes are performed. Moreover, it is also required that the fluid flow face and the low channels on both sides of the non-active surface are aligned so that the fluid can flow without obstruction.

SUMMARY OF THE INVENTION

The present invention provides a fuel cell fluid flow plate, comprising: a fluid flow plate having one face being a fluid flow face for receiving a reactive fluid and the other face being a non-active surface, the fluid flow plate being provided with a first manifold, a second manifold and at least one flow channel disposed on the fluid flow face, the at least one flow channel being respectively connected to the first manifold by way of a first flow channel opening and to the second manifold by way of a second flow channel opening; and a shell passageway piece having a first face and a second face that are disposed in parallel and are connected to each other through a connecting face with at least one through hole provided thereon so that the first face contacts the fluid flow face, the second face contacts the non-active surface, and the first manifold communicates with the first flow channel opening by way of the through hole when the shell passageway piece and the fluid flow plate are combined.

The present invention further provides a fuel cell, comprising: at least one fuel cell unit, two current collectors for clipping the fuel cell unit; two end plates for clipping the two current collectors, respectively; and at least one fastener for fastening the end plates. The at least one fuel cell unit comprises two fuel cell fluid flow plates, an electrochemical reaction layer disposed between the fluid flow faces of the fuel cell fluid flow plates and contacting the fluid flow faces; and a sealing member disposed in the grooves. Each of the fluid flow plate comprises a fluid flow plate and a shell passageway piece. The fluid flow plate has one face being a fluid flow face for receiving a reactive fluid and the other face being a non-active surface. The fluid flow plate is provided with a first manifold, a second manifold and at least one flow channel disposed on the fluid flow face. The at least one flow channel is respectively connected to the first manifold by way of a first flow channel opening and to the second manifold by way of a second flow channel opening. The fluid flow plate is provided with a groove disposed on a boundary portion of the fluid flow plate. The shell passageway piece has a first face and a second face that are disposed in parallel and are connected to each other through a connecting face with at least one through hole provided thereon so that the first face contacts the fluid flow face, the second face contacts the non-active surface, and the first manifold communicates with the first flow channel opening by way of the through hole when the shell passageway piece and the fluid flow plate are combined.

BRIEF DESCRIPTION OF THE DRAWINGS

The objects and spirits of various embodiments of the present invention will be readily understood by the accompanying drawings and detailed descriptions, wherein:

FIG. 7A is a cross-sectional view showing part of a fuel cell fluid flow plate with a shell passageway piece according to one embodiment of the present invention;

FIG. 7B is a cross-sectional view showing part of a fuel cell fluid flow plate with a shell passageway piece according to another embodiment of the present invention;

FIG. 7C is a cross-sectional view showing part of a fuel cell fluid flow plate with a shell passageway piece according to another embodiment of the present invention;

FIG. 7D is a cross-sectional view showing part of a fuel cell fluid flow plate with a shell passageway piece according to another embodiment of the present invention;

FIG. 7E is a cross-sectional view showing part of a fuel cell fluid flow plate with a shell passageway piece according to another embodiment of the present invention; and FIG. 7F is a cross-sectional view showing part of a fuel cell fluid flow plate with a shell passageway piece according to another embodiment of the present invention.

DETAILED DESCRIPTION OF THE PREFERRED EMBODIMENT

The present invention can be exemplified but not limited by the embodiments as described hereinafter.

Figure 1:
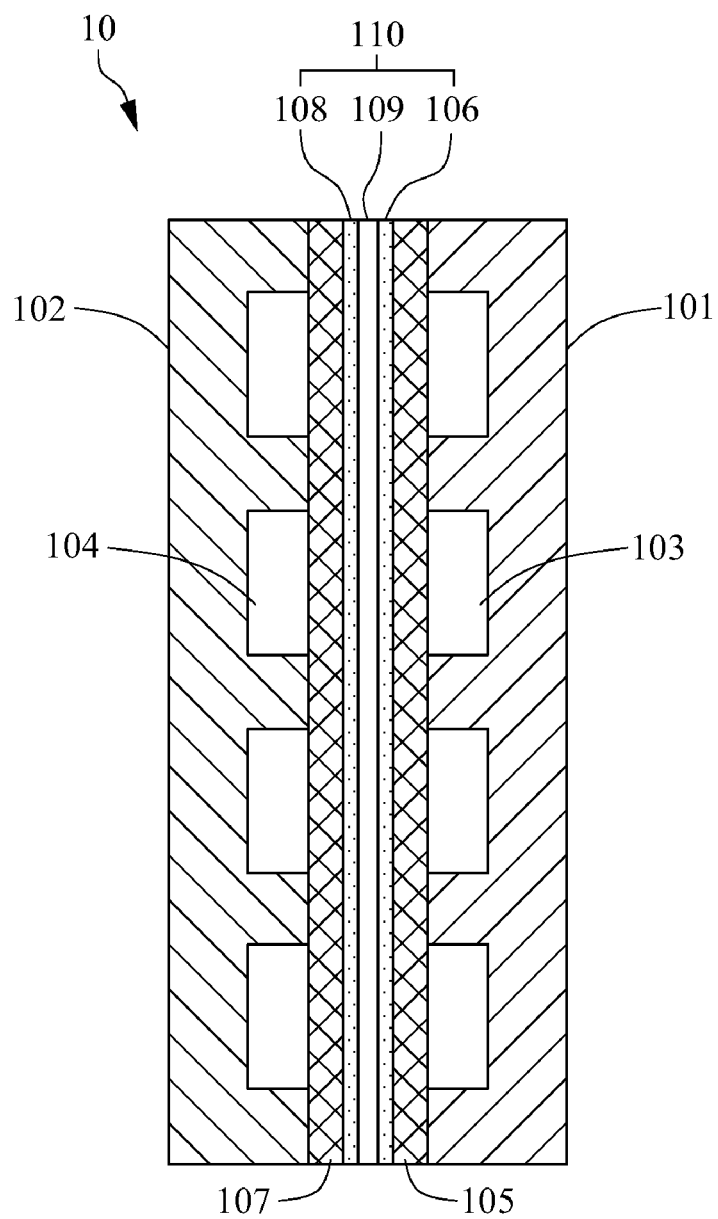
FIG. 1 is a cross-sectional view of a conventional fuel cell unit.
Figure 2:
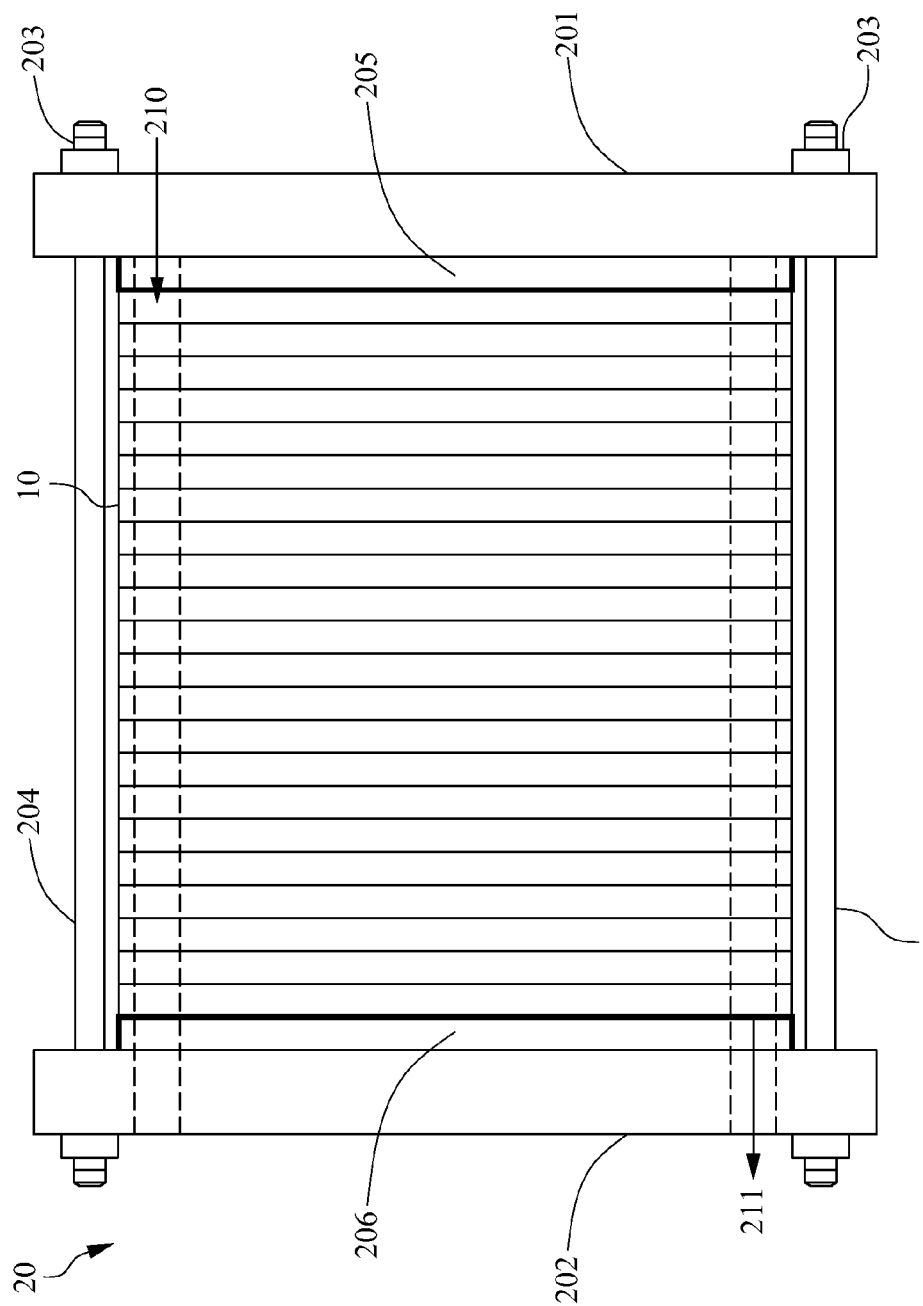
FIG. 2 is a side view of a conventional fuel cell stack.
Figure 3:
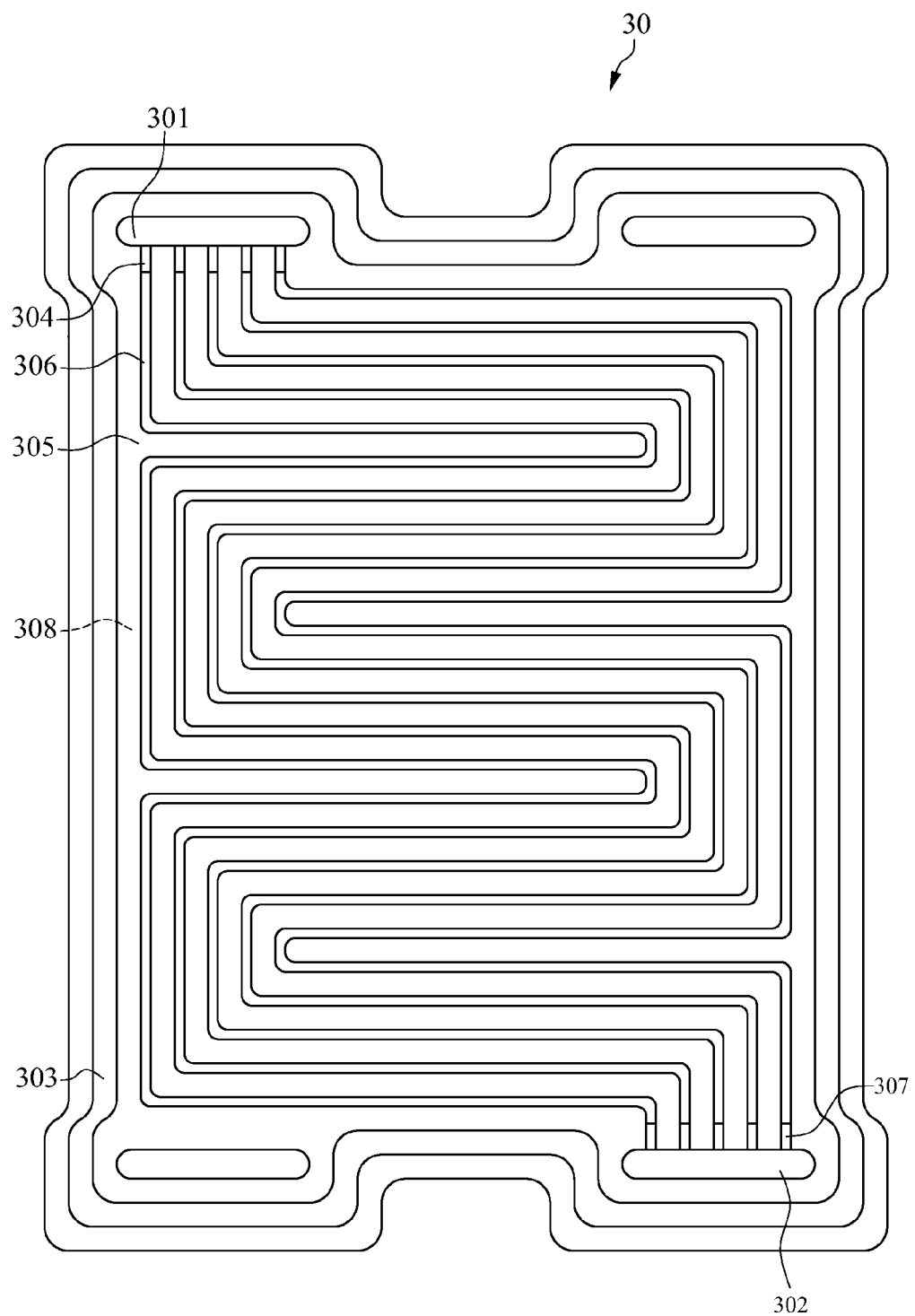
FIG. 3 schematically shows a conventional fuel cell fluid flow plate.
Figure 4:
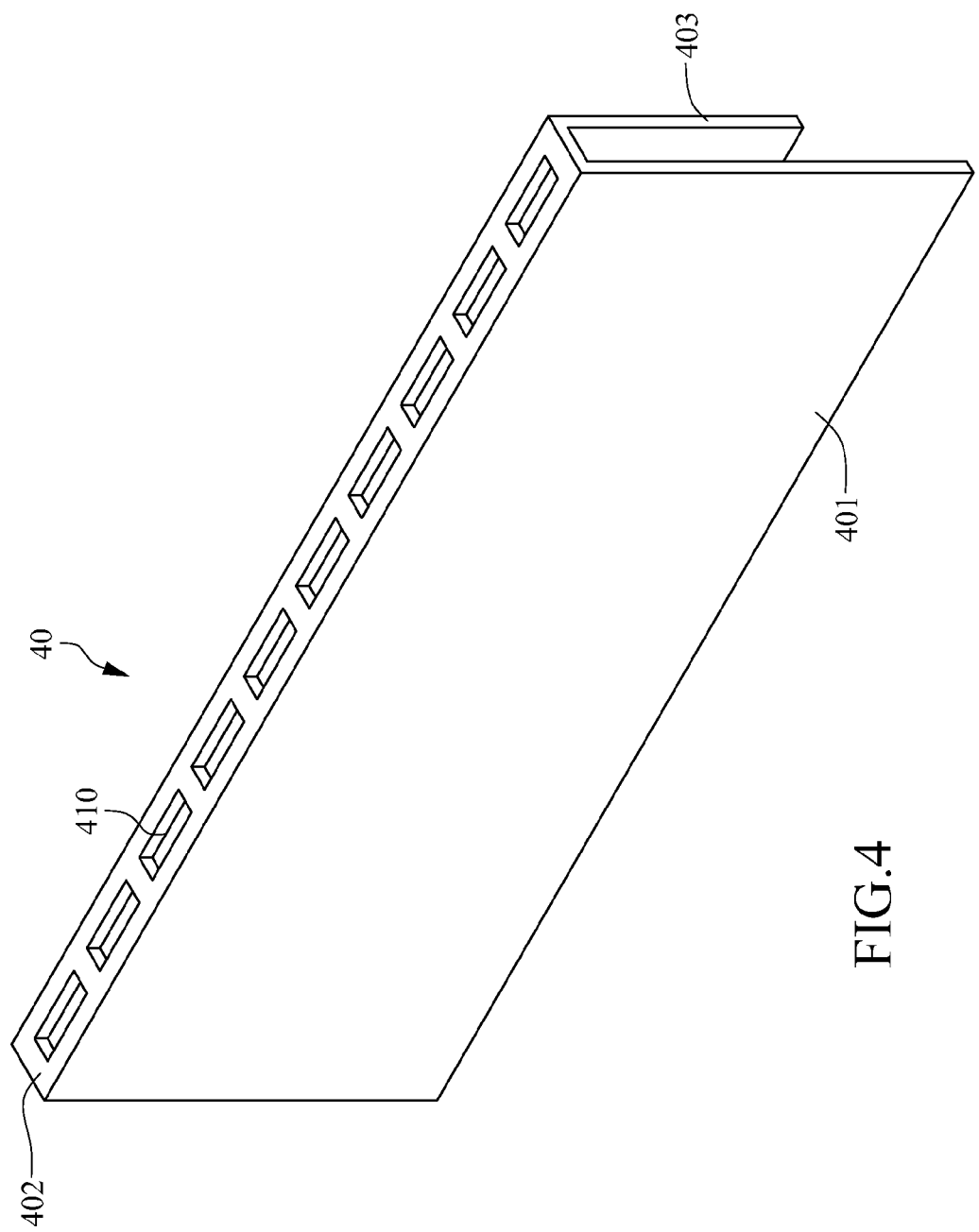
FIG. 4 is a 3D view of a shell passageway piece according to the present invention.
Figure 5:
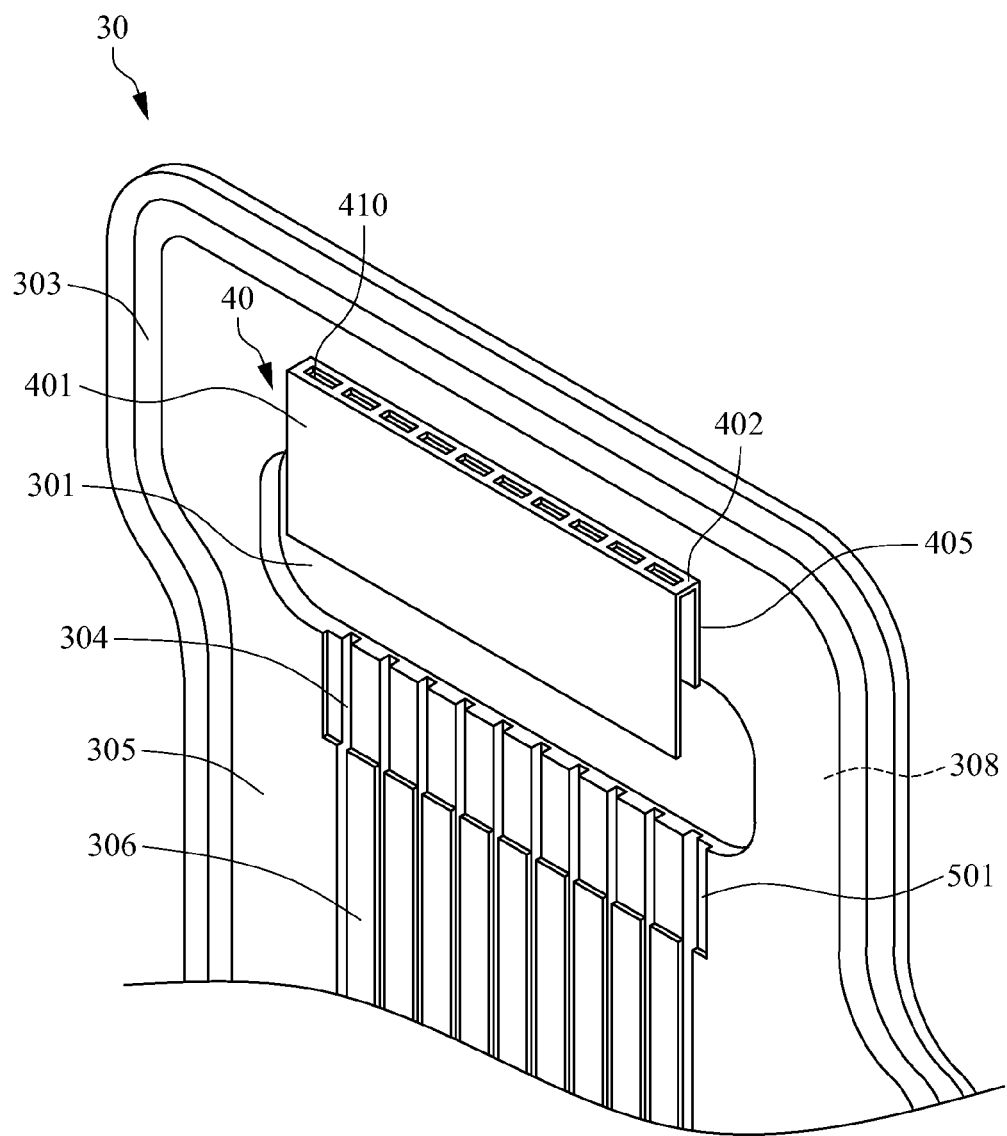
FIG. 5 is a schematic diagram showing a shell passageway piece and a fuel cell fluid flow plate according to the present invention before they are combined.
Figure 6:
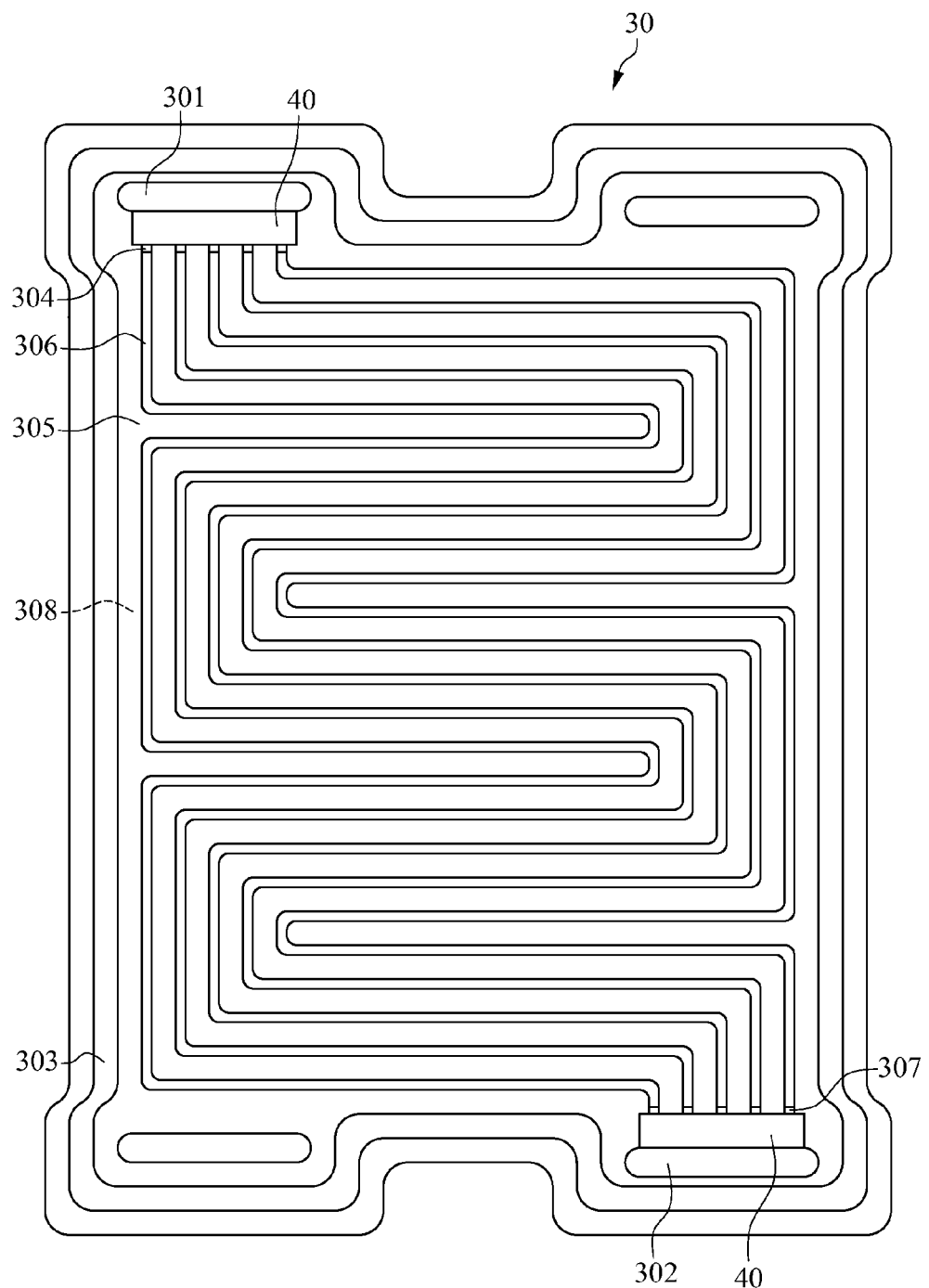
FIG. 6 is a schematic diagram showing a shell passageway piece and a fuel cell fluid flow plate according to the present invention after they are combined.

FIG. 4 is a 3D view of a shell passageway piece according to the present invention; FIG. 5 is a schematic diagram showing a shell passageway piece and a fuel cell fluid flow plate according to the present invention before they are combined; and FIG. 6 is a schematic diagram showing a shell passageway piece and a fuel cell fluid flow plate according to the present invention after they are combined.

The present invention discloses a fuel cell fluid flow plate 30 with a shell passageway piece 40. As shown in FIG. 4, the shell passageway piece 40 is structured as U-shaped or 7-shaped, comprising: a first face 401 and a second face 403 that are disposed in parallel and connected to each other through a connecting face 402 disposed therebetween.

The first face 401 is disposed on the same side as the fluid flow face 305 when the first face 401 and the fluid flow plate 30 are combined. In other words, the first face 401 contacts the fluid flow face 305 so as to support the membrane electrode assembly and the gas diffusion layers (not shown). The fluid flow plate 30 is provided with a groove 303 disposed on a boundary portion so that a sealing member (such as an O-ring, not shown) can be disposed in the groove 303.

The second face 403 is capable of clipping, inserting into or buttoning the non-active surface 308 of the fluid flow plate 30. According to the structure of the non-active surface 308, the second face 403 can be planar, L-shaped for inserting into the fluid flow plate 30, or provided with a socket to match the structure of the fluid flow plate 30, as will be descried later.

There is an angle between the connecting face 402 and each of the first face 401 and the second face 403. For example, the connecting face 402 is perpendicular to the first face 401 and second face 403, respectively. The connecting face 402 is provided with at least one through hole 410 penetrating the connecting face 402. Therefore, the reactant fluid (not shown) flows from the inlet manifold 301 (the first manifold) into the entry 304 (the first flow channel opening) by way of the through hole 410, or the reacted fluid (not shown) flows from the export 307 (the second flow channel opening) to be exhausted from the outlet manifold 302 (the second manifold) by way of the through hole 410.

The shell passageway piece 40 can be formed of any appropriate material by any appropriate manufacturing technique such as stamping molding, die-casting molding and injection molding so as to be used with various fluid flow plates.

FIG. 5 is a schematic diagram showing a shell passageway piece and a fuel cell fluid flow plate according to the present invention before they are combined. In the fluid flow plate 30 of the present invention, an angle from 0 to 90 degrees is constructed between the fluid flow face 305 and each of the entry 304 (the first flow channel opening) and the export 307

(the second flow channel opening) of the flow channel 306. The shell passageway piece 40 is combined with the fluid flow plate 30 by clipping. More particularly, the construction face 405 contacts the socket 501 on the fluid flow plate 30 so that a planar surface is formed by the first face 401 and the fluid flow face 305 to support the membrane electrode assembly and the gas diffusion layers (not shown). The connecting face 402 contacts or get close to the entry 304 (or export 307) of the flow channel 306. The through hole 410 is aligned with the entry 304 (or export 307) of the flow channel 306 so that the fluid flows without obstruction. The second face 403 clips the non-active surface 308 of the fluid flow plate 30. Meanwhile, a planar surface is formed by the second face 403 and the non-active surface 308. Accordingly, the fuel cell unit can tightly contact the non-active surface another fuel cell unit (not shown). Therefore, the fuel cell fluid flow plate is combined with the shell passageway piece, as shown in FIG. 6.

When the reactant fluid flows from the inlet manifold 301 (the first manifold) into the inclined entry 304 (the first flow channel opening) by way of the through hole 410, the reactant fluid flows fluently and uniformly into the flow channel 306 in fuel cell 10 and is distributed for electrochemical reaction. When the reacted fluid flows from the inclined export 307 (the second flow channel opening) through the through hole 410 to be exhausted from the outlet manifold 302 (the second manifold), the reacted fluid flows fluently. FIG. 7A to FIG. 7F are cross-sectional views showing part of a fuel cell fluid flow plate with a shell passageway piece according to various embodiments of the present invention. More particularly, FIG. 7A is a cross-sectional view of FIG. 5, and thus description there is not repeated.

FIG. 7B is a modification of FIG. 7A. FIG. 7B is different from FIG. 7A in that the second face 403 in FIG. 7B is L-shaped so as to match the groove 502 provided on the non-active surface 308 on the fluid flow plate 30. Therefore, in FIG. 7B, the second face 403 is inserted into the fluid flow plate 30 for tight combination.

FIG. 7C is a modification of FIG. 7A. FIG. 7C is different from FIG. 7A in that the first flow channel opening (entry) of the flow channel 306 is in parallel with the fluid flow face. The first face 401 does not support the membrane electrode assembly 110 and the gas diffusion layers (not shown). Instead, the first face 401 is at the same height level with the membrane electrode assembly 110 and the gas diffusion layers (not shown). A sealing member (not shown) is used for air-tightness. The second face 403 is provided with a socket so as to match the bump on the non-active surface 308 on the fluid flow plate 30. Therefore, in FIG. 7C, the second face 403 clips the fluid flow plate 30 for tight combination.

FIG. 7D is a modification of FIG. 7A. FIG. 7D is different from FIG. 7A in that the connecting face 402 is not perpendicular to the first face 401 and the second face 403 so that the through hole 410 extends into the inlet manifold 301 (or outlet manifold, not shown).

FIG. 7E is a modification of FIG. 7A. FIG. 7E is different from FIG. 7A in that the connecting face 402 is provided with two through holes 410. In other words, there can be plural through holes arranged in an array.

FIG. 7F is a modification of FIG. 7A. FIG. 7 F is different from FIG. 7A in that the through hole 410 extends as a part of the flow channel 306 after the first face 401 is thickened and deformed according to the entry 304 (the first flow channel opening) so that the reactant fluid 210 flows through fuel cell fluid flow plate. Meanwhile, the first face 401 is at the same height level with the membrane electrode assembly 110 and the gas diffusion layers (not shown) instead of supporting the membrane electrode assembly 110 and the gas diffusion layers.

Accordingly, the present invention provides a fuel cell fluid flow plate having a shell passageway piece, wherein the shell passageway piece is combined with the fluid flow plate by clipping, insertion or buttoning at the first flow channel opening (entry) and/or the second flow channel opening (export) so that the first flow channel opening (entry) and/or the second flow channel opening (export) communicates with the first manifold (the inlet manifold) and/or the second manifold (the outlet manifold) to enable the reactant fluid to flow without obstruction. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A fuel cell fluid flow plate, comprising:
  a fluid flow plate having one face being a fluid flow face for receiving a reactive fluid and the other face being a non-active surface, the fluid flow plate being provided with a first manifold, a second manifold and at least one flow channel disposed on the fluid flow face, the at least one flow channel being respectively connected to the first manifold by way of a first flow channel opening and to the second manifold by way of a second flow channel opening, wherein a first angle is formed between the fluid flow face and the first flow channel opening, and a second angle is formed between the fluid flow face and the second flow channel opening; and
  a shell passageway piece, being "U"-shaped, having a first face and a relatively shorter second face that are disposed in parallel and are connected to each other through a connecting face with at least one through hole provided thereon so that the first face contacts the fluid flow face, the second face contacts the non-active surface, and the first manifold communicates with the first flow channel opening by way of the through hole when the shell passageway piece and the fluid flow plate are combined, wherein the second face is provided with a socket so as to match a bump on the non-active surface of the fluid flow plate.

2. The fuel cell fluid flow plate as recited in claim 1, wherein the fluid flow face contacts an electrochemical reaction layer.

3. The fuel cell fluid flow plate as recited in claim 2, wherein the electrochemical reaction layer comprises two membrane electrode layers and a gas diffusion layer disposed between the membrane electrode layers.

4. The fuel cell fluid flow plate as recited in claim 1, wherein the fluid flow plate is provided with a groove disposed on a boundary portion of the fluid flow plate.

5. The fuel cell fluid flow plate as recited in claim 4, wherein a sealing member is disposed in the groove.

6. The fuel cell fluid flow plate as recited in claim 1, wherein the connecting face is perpendicular to the first face and the second face, respectively.

7. The fuel cell fluid flow plate as recited in claim 1, wherein the second face is connected to the non-active surface by insertion.

8. A fuel cell fluid flow plate, comprising:
  a fluid flow plate having one face being a fluid flow face for receiving a reactive fluid and the other face being a non-active surface, the fluid flow plate being provided with a first manifold, a second manifold and at least one flow channel disposed on the fluid flow face, the at least one flow channel being respectively connected to the first manifold by way of a first flow channel opening and to the second manifold by way of a second flow channel opening, wherein a first angle is formed between the fluid flow face and the first flow channel opening, and a second angle is formed between the fluid flow face and the second flow channel opening;

a first shell passageway piece, being "U"-shaped, having a first face and a relatively shorter second face that are disposed in parallel and are connected to each other through a first connecting face with at least one first through hole provided thereon so that the first face contacts the fluid flow face, the second face contacts the non-active surface, and the first manifold communicates with the first flow channel opening by way of the first through hole when the first shell passageway piece and the fluid flow plate are combined, wherein the second face is provided with a socket so as to match a bump on the non-active surface of the fluid flow plate; and a second shell passageway piece, being "U"-shaped, having a third face and a relatively shorter fourth face that are disposed in parallel and are connected to each other through a second connecting face with at least one second through hole provided thereon so that the third face contacts the fluid flow face, the fourth face contacts the non-active surface, and the second manifold communicates with the second flow channel opening by way of the second through hole when the second shell passageway piece and the fluid flow plate are combined, wherein the fourth face is provided with a socket so as to match a bump on the non-active surface of the fluid flow plate.

9. The fuel cell fluid flow plate as recited in claim 8, wherein the fluid flow face contacts an electrochemical reaction layer.

10. The fuel cell fluid flow plate as recited in claim 9, wherein the electrochemical reaction layer comprises two membrane electrode layers and a gas diffusion layer disposed between the membrane electrode layers.

11. The fuel cell fluid flow plate as recited in claim 8, wherein the fluid flow plate is provided with a groove disposed on a boundary portion of the fluid flow plate.

12. The fuel cell fluid flow plate as recited in claim 11, wherein a sealing member is disposed in the groove.

13. The fuel cell fluid flow plate as recited in claim 8, wherein the first connecting face is perpendicular to the first face and the second face, respectively.

14. The fuel cell fluid flow plate as recited in claim 8, wherein the second connecting face is perpendicular to the third face and the fourth face, respectively.

15. The fuel cell fluid flow plate as recited in claim 8, wherein the second face is connected to the non-active surface by insertion.

16. The fuel cell fluid flow plate as recited in claim 8, wherein the fourth face is connected to the non-active surface by insertion.

17. A fuel cell, comprising:
at least one fuel cell unit, comprising:
two fuel cell fluid flow plates, each comprising:
a fluid flow plate having one face being a fluid flow face for receiving a reactive fluid and the other face being a non-active surface, the fluid flow plate being provided with a first manifold, a second manifold and at least one flow channel disposed on the fluid flow face, the at least one flow channel being respectively connected to the first manifold by way of a first flow channel opening and to the second manifold by way of a second flow channel opening, the fluid flow plate being provided with a groove disposed on a boundary portion of the fluid flow plate, wherein a first angle is formed between the fluid flow face and the first flow channel opening, and a second angle is formed between the fluid flow face and the second flow channel opening; and a shell passageway piece, in a being "U"-shaped, having a first face and a relatively shorter second face that are disposed in parallel and are connected to each other through a connecting face with at least one through hole provided thereon so that the first face contacts the fluid flow face, the second face contacts the non-active surface, and the first manifold communicates with the first flow channel opening by way of the through hole when the shell passageway piece and the fluid flow plate are combined, wherein the second face is provided with a socket so as to match a bump on the non-active surface of the fluid flow plate;

an electrochemical reaction layer disposed between the fluid flow faces of the fuel cell fluid flow plates and contacting the fluid flow faces; and a sealing member disposed in the grooves;
two current collectors for clipping the fuel cell unit;
two end plates for clipping the two current collectors, respectively; and
at least one fastener for fastening the end plates.

18. The fuel cell fluid flow plate as recited in claim 17, wherein the electrochemical reaction layer comprises two membrane electrode layers and a gas diffusion layer disposed between the membrane electrode layers.

19. The fuel cell as recited in claim 17, wherein the connecting face is perpendicular to the first face and the second face, respectively.

20. The fuel cell as recited in claim 17, wherein the second face is connected to the non-active surface by insertion.

21. A fuel cell, comprising:
at least one fuel cell unit, comprising:
two fuel cell fluid flow plates, each comprising:
a fluid flow plate having one face being a fluid flow face for receiving a reactive fluid and the other face being a non-active surface, the fluid flow plate being provided with a first manifold, a second manifold and at least one flow channel disposed on the fluid flow face, the at least one flow channel being respectively connected to the first manifold by way of a first flow channel opening and to the second manifold by way of a second flow channel opening, the fluid flow plate being provided with a groove disposed on a boundary portion of the fluid flow plate, wherein a first angle is formed between the fluid flow face and the first flow channel opening, and a second angle is formed between the fluid flow face and the second flow channel opening;

a first shell passageway piece, in a being "U"-shaped, having a first face and a relatively shorter second face that are disposed in parallel and are connected to each other through a first connecting face with at least one first through hole provided thereon so that the first face contacts the fluid flow face, the second face contacts the non-active surface, and the first manifold communicates with the first flow channel opening by way of the first through hole when the first shell passageway piece and the fluid flow plate are combined, wherein the second face is provided with a socket so as to match a bump on the non-active surface of the fluid flow plate; and a second shell passageway piece, in a being "U"-shaped, having a third face and a relatively shorter fourth face that are disposed in parallel and are connected to each other through a second connecting face with at least one second through hole provided thereon so that the third face contacts the fluid flow face, the fourth face contacts the non-active surface, and the second manifold communicates with the second flow channel opening by way of the second through hole when the second shell passageway piece and the fluid flow plate are combined, wherein the fourth face is provided with a socket so as to match a bump on the non-active surface of the fluid flow plate;

an electrochemical reaction layer disposed between the fluid flow faces of the fuel cell fluid flow plates and contacting the fluid flow faces; and a sealing member disposed in the grooves;

two current collectors for clipping the fuel cell unit;

two end plates for clipping the two current collectors, respectively; and at least one fastener for fastening the end plates.

22. The fuel cell as recited in claim 21, wherein the electrochemical reaction layer comprises two membrane electrode layers and a gas diffusion layer disposed between the membrane electrode layers.

23. The fuel cell as recited in claim 21, wherein the first connecting face is perpendicular to the first face and the second face, respectively.

24. The fuel cell as recited in claim 21, wherein the second connecting face is perpendicular to the third face and the fourth face, respectively.

25. The fuel cell as recited in claim 21, wherein the second face is connected to the non-active surface by insertion.

26. The fuel cell as recited in claim 21, wherein the fourth face is connected to the non-active surface by insertion.

* * * * *